United States Patent [19]

Fellows

[11] 4,336,306

[45] Jun. 22, 1982

[54] ELECTROSTATIC IMAGING SHEET

[76] Inventor: Adrian N. Fellows, 48 Bury New Rd., Ramsbottom, Bury, Lancashire, England

[21] Appl. No.: 93,432

[22] Filed: Nov. 13, 1979

[30] Foreign Application Priority Data

Nov. 13, 1978 [GB] United Kingdom ............... 44242/78
Nov. 17, 1978 [GB] United Kingdom ............... 45049/78
Aug. 22, 1979 [GB] United Kingdom ................. 7929205

[51] Int. Cl.[3] ...................... G01D 15/06; G01D 15/34; B32B 7/00; G03G 7/00

[52] U.S. Cl. ................................. 428/341; 346/135.1; 346/153.1; 427/121; 428/211; 428/331; 428/342; 428/448; 428/452; 428/454; 428/412; 428/421; 430/48

[58] Field of Search ................ 427/121; 428/195, 211, 428/452, 454, 537, 206, 208, 331, 341, 342, 448, 450; 346/135.1, 153.1

[56] References Cited

U.S. PATENT DOCUMENTS 3,653,894 4/1972 Levy et al. ......................... 427/121

*Primary Examiner*—Bruce H. Hess
*Attorney, Agent, or Firm*—Frank P. Cyr

[57] ABSTRACT

An electrostatic imaging sheet wherein one side of the sheet, e.g. paper, is electrically conductive and the other side of the sheet has a continuous dielectric layer comprising a mixture of a smectite clay e.g. a synthetic hectorite swelling clay and an electrically insulating polymer, preferably in particle form. The dielectric layer may comprise a layer of a smectite clay which forms a barrier between the electrically conductive layer and the layer of insulating polymer.

The invention is also a dielectric coating composition comprising a mixture of electrically insulating polymer in aqueous dispersion and a water dispersible smectite clay.

The mixture of polymer and water dispersible smectite clay, preferably form a colloidal suspension, and the amount of smectite clay in the composition is preferably in the range 0.5 to 5% by weight of the composition excluding inorganic filler.

The invention is also a method of coating a sheet material which comprises dispersing a mixture of an electrically insulating polymer and a water dispersible smectite clay in an aqueous system and coating the sheet material with the aqueous dispersion. An alternative method of coating a sheet material to produce an electrostatic imaging sheet comprises coating one side of the sheet material with an aqueous dispersion of water dispersible smectite clay, to form a barrier on the sheet prior to coating the sheet with an aqueous system containing an electrically insulating polymer.

The polymer may be selected from the group consisting of polyalkenes, substituted polyalkenes, acrylic polymers, vinyl polymers, polystyrene, polyesters, polyvinylidene chloride, polyamides, polycarbonates, polytetrafluoroethylene, polybutadiene, co-polymers of these materials and styrene acrylic co-polymers.

12 Claims, No Drawings

ELECTROSTATIC IMAGING SHEET

The invention relates to a method of coating sheet material and to a dielectric coating composition for use in the method. More particularly the invention relates to an electrostatic imaging sheet comprising a base, e.g. of paper, having an electroconductive layer and having on one side a continuous layer of a dielectric material.

From U.S. Pat. No. 3,075,859 of A. B. Dick Company it is known that a latent electrostatic image may be transferred from a suitably charged array to a copy sheet and that this latent image may then be developed by means of applying and fixing charged toner particles. For this process to operate satisfactorily it is necessary for the copy sheet to have certain properties, particularly in that it should comprise two layers, one being an electrically conducting base sheet and the other being an electrically insulating or dielectric layer which receives the latent image in the form of an electrostatic charge and is capable of retaining the charge for a period of time sufficient to allow development and fixing.

It is known to produce an electrically conducting base sheet by adding to a base paper conducting salts or polyelectrolyte resins or humectant materials or combinations of these materials. The conducting salts, humectants and polyelectrolyte resins being water soluble may be added to the fibre slurry in the papermaking process or may be applied by various means after formation of the paper sheet.

It is also known to coat such a conducting base sheet with a solvent solution of an electrically insulating polymer and by removal of residual solvent to produce a dielectric copy sheet.

It has been appreciated for a long time that it would be advantageous for the dielectric layer to be applied as an aqueous coating and a number of attempts have been made in this direction involving the use of different water soluble polymers, emulsion polymers and the like. These attempts have not been significantly successful because of inherent deficiencies in the materials themselves, and also because of production difficulties, since as the conductive elements of the base sheet are intrinsically water miscible they tend to migrate into the dielectric coating with consequent deleterious effect upon its resistivity, its ability to perform as a charge receptor, and the ability of the sheet as a whole to form and hold an image in use.

It is an object of this invention to provide an electrostatic imaging paper using an aqueous system to apply the dielectric layer, but in such a manner as to overcome the prior art deficiencies.

From a first aspect the invention provides an electrostatic imaging sheet wherein one side of the sheet is electrically conductive and the other side of the sheet has a continuous dielectric layer comprising a mixture of a smectite clay and an electrically insulating polymer.

From another aspect the invention provides an electrostatic imaging sheet wherein one side of the sheet is electrically conductive and the other side of the sheet has a layer of a smectite clay which forms a barrier between the electrically conductive layer and a dielectric layer of an insulating polymer.

From a further aspect the invention provides a dielectric coating composition comprising a mixture of electrically insulating polymer in aqueous dispersion and a water dispersible smectite clay.

From yet another aspect the invention provides a method of coating a sheet material which comprises dispersing a mixture of an electrically insulating polymer and a water dispersible smectite clay in an aqueous system and coating the sheet material with the aqueous dispersion.

From a still further aspect the invention provides a method of coating a sheet material to produce an electrostatic imaging sheet comprising coating one side of the sheet material with an aqueous dispersion of water dispersible smectite clay, to form a barrier on the sheet prior to coating the sheet with an aqueous system containing an electrically insulating polymer.

In practice a coating composition as described above will usually be in the form of a colloidal suspension, although alternatively it can be in the form of a thixotropic gel. The coating composition may incorporate other materials, e.g. inorganic fillers such as kaolin, titanium dioxide, whitings, china clay and the like.

Suitable polymers may be selected from the following namely polyalkenes, substituted polyalkenes, acrylic polymers, vinyl polymers, polystyrene, polyesters, polyvinylidene chloride, polyamides, polycarbonates, polytetrafluoroethylene, polybutadiene, copolymers of these materials, and styrene acrylic co-polymers. The polymer may be in fibre or particle form, or as a solution, dispersion or colloidal suspension. The polymer is preferably in the form of an aqueous suspension of fine particles e.g. in the range 0.1 to 10 microns.

The water dispersible smectite clay possesses a layered lattice or platelet type structure, and includes the so called swelling clay varieties montmorillonite, bentonite and hectorite. Particularly useful is the synthetic hectorite swelling clay sold by Laporte Industries Ltd. under the registered trade mark LAPONITE. This material disperses in water or aqueous polymer containing compositions to give colloidal dispersions of suitable rheology for sheet coating purposes. The colloidal nature, primary particle size and morphology of the synthetic hectorite is advantageous since the hectorite containing composition has the property of remaining on the surface of the sheet rather than soaking in and mixing with the conducting layer. This is particularly of importance where it is desired to coat a ground-wood or mechanical paper, which has a relatively open structure. The primary particle morphology, namely a platelet-like structure, and the excellent film forming properties of the synthetic hectorite are of further value in that they tend to prevent penetration and poisoning of the dielectric layer by conductive elements. The synthetic hectorite possesses a further useful property namely that in aqueous dispersion the synthetic hectorite is anionic in character. It will therefore react with cationic materials such as those typically used to provide the conductivity of the base sheet to form an ionically inert material, and when this reaction occurs a physical barrier against migration is formed between the two layers. Once dried, the synthetic hectorite film ceases to be ionic and therefore does not detract from the dielectric properties of the polymer present in the composition, and indeed contributes to the establishment and maintenance of the desired electrical properties of the sheet surface. The film forming properties and structure of the film also serve to prevent lifting of fibres from the base sheet.

A sheet of dielectric paper in accordance with the invention may be produced in a number of ways, for example:

(1) By applying a coating composition comprising the polymer and synthetic hectorite to a sheet of paper which has been previously treated to render it electrically conductive.

(2) By applying the coating composition comprising the polymer and synthetic hectorite to a sheet of untreated paper as a first step and applying the conductive coating or treatment as a second step.

Either of these two processes may be applied as a continuous or machine process during the manufacture of the paper, or part or all of the coating operation may be carried out as an off-machine process on suitable pre-produced base paper. Alternatively it may be advantageous to add either the electrically conductive material, or the dielectric composition to the fibre slurry before formation of the web. Other processes normally applied in the manufacture of paper will of course be relevant in the manufacture of the sheet within the scope of this invention, e.g. drying, calendaring etc. In the case of drying, it may be necessary to apply heat additional to that required for drying per se, in order fully to cure the dielectric coating.

It is also proposed to form an electrostatic imaging sheet in the following manner. A coating of synthetic hectorite in aqueous dispersion is first applied to a base sheet, which is either treated to render it conductive or plain as desired, and the coating, which forms a barrier, is then dried. A second coating comprising an aqueous polymer system is then applied on top of the synthetic hectorite layer. The second coating would normally include inert filler material such as kaolin, and may beneficially contain synthetic hectorite in dispersion. In the case of application of the above described two coat system to plain untreated base paper a further treatment of the base paper with electrically conductive resin is then required.

It might be desirable to mitigate against the possibility of the electrical charging of dielectric sheet material due to the ionic properties of the synthetic hectorite when in the presence of water. To achieve this in accordance with the invention the synthetic hectorite may be reacted with a cationic agent so as to block at least partly the ionic sites on the hectorite structure. The ionic blocking has the effect of preventing an increase in the electrical conductivity of the coating at high relative humidity and also has the effect of breaking down the colloid or gel with a consequent improvement in ease of coating.

The cationic agent may be a bifunctional cationic, a polymeric cationic, or a quaternary ammonium compound.

The reaction may be carried out stoichiometrically or alternatively an excess of the cationic agent may be used and the excess charge neutralised subsequently.

The invention will now be specifically described by means of the following examples.

Dielectric material aqueous dispersion coating compositions were prepared as follows, in which all parts are by weight.

| | |
|---|---|
| EXAMPLE 1 | |
| An acrylic polymer dispersion, e.g. that sold by Ashland Chemical Company Inc. under the trade name ASHLAND DEA-015 | 200 parts |
| Kaolin | 100 parts |
| Laponite (Registered Trade Mark) | 4 parts |
| EXAMPLE 2 | |

-continued

| | |
|---|---|
| Polyethylene polymer dispersion | 200 parts |
| Titanium dioxide | 80 parts |
| Laponite | 8 parts |
| EXAMPLE 3 | PARTS |
| Styrene acrylic polymeric dispersion e.g. VINACRYL 7170 (Vinyl Products Ltd.) | 180 |
| Silica pigment material | 20 |
| Laponite | 5 |
| EXAMPLE 4 | |
| Polyvinyl Butyral e.g. Butvar B-76 (Monsanto Europe N.V.) | 100 |
| Water | 100 |
| Kaolin | 110 |
| Dispersant | 0.5 |
| Laponite | 4 |
| EXAMPLE 5 | |
| Polyethylene pulp fibre e.g. Pulpex (Solvay Cie) | 10 |
| Water | 190 |
| Kaolin | 50 |
| Laponite | 4 |
| EXAMPLE 6 | |
| Polyethylene polymer particle size between 0.2-10 microns | 100 |
| Whitings | 100 |
| Water | 200 |
| Laponite | 6 |

Coating compositions within the scope of the invention contain between 0.25 and 5% by weight of synthetic hectorite and preferably between 2 and 4% by weight of synthetic hectorite, on the assumption that the filler is excluded from the calculation. The proportions and nature of both the polymer and filler present may vary within wide limits governed by factors including the electrical properties of the materials, the viscosity of the composition, the behaviour of the composition under shear and so on.

The dielectric coating is applied to a base paper to give coat weights between 2 and 25 gms/m$^2$ and preferably between 5 and 10 gms/m$^2$.

Electrostatic imaging paper produced by coating paper with the compositions of the above Examples was tested by the normal procedures established for evaluating dielectric papers and was found to be satisfactory.

I claim:

1. An electrostatic imaging sheet which is comprised of a substrate treated to be suitably electrically conductive and a dielectric layer thereon which is the resultant of deposition from an aqueous dispersion comprising a mixture of a smectite clay and a dielectric polymer which is adapted to retain a latent electrostatic image, said clay forming at the interface between the conductive substrate and the dielectric layer a barrier layer which prevents migration and is substantially non-ionic.

2. An electrostatic imaging sheet as in claim 1 wherein the smectite clay is hectorite.

3. An electrostatic imaging sheet according to any of claims 1 or 2 wherein the dielectric layer is continuous and has a coat weight of between 2 and 25 gms/m$^2$.

4. An electrostatic imaging sheet as in claim 3 wherein the coat weight is between 5 and 10 gms/m$^2$.

5. An electrostatic imaging sheet as in claim 4 wherein the mixture comprises an inorganic filler.

6. An electrostatic imaging sheet as in claim 5 wherein the amount of hectorite is in the range of 0.5 to 5% by weight of the mixture excluding inorganic filler.

7. An electrostatic imaging sheet as in claim 6 wherein the amount of hectorite is in the range of 2 to 4% by weight of the mixture excluding inorganic filler.

8. An electrostatic imaging sheet according to any of claims 1 or 2 wherein the polymer is selected from the group consisting of polyalkenes, substituted polyalkenes, acrylic polymers, polystyrene, polyesters, polyvinylidene chloride, polyamides, polycarbonates, polytetrafluoroethylene, polybutadiene and co-polymers thereof.

9. An electrostatic imaging sheet according to any of claims 1 or 2 wherein the substrate is paper.

10. An electrostatic imaging sheet as in claim 9 wherein the paper is ground-wood paper.

11. An electrostatic imaging sheet as in claim 2 wherein the amount of hectorite is in the range of 0.5 to 5% by weight of the mixture.

12. An electrostatic imaging sheet as in claim 11 wherein the amount of hectorite is in the range of 2 to 4% by weight of the mixture.

* * * * *